US005444263A

United States Patent [19]

Mastnak

[11] Patent Number: 5,444,263
[45] Date of Patent: Aug. 22, 1995

[54] INSTRUMENT FOR THE VISUAL RECOGNITION OF AUTHENTICITY FEATURES IN BANKNOTES AND SECURITY DOCUMENTS

[75] Inventor: Wolfgang R. Mastnak, Ligusterweg, Germany

[73] Assignee: Systec Ausbausysteme GmbH, Eichenau, Germany

[21] Appl. No.: 257,138

[22] Filed: Jun. 9, 1994

[30] Foreign Application Priority Data

Jun. 14, 1993 [DE] Germany .......................... 9308828 U
Mar. 18, 1994 [DE] Germany .......................... 9404643 U

[51] Int. Cl.[6] .......................... G06K 5/00
[52] U.S. Cl. .......................... 250/504 H; 250/493.1; 283/85; 283/92
[58] Field of Search .......................... 250/493.1, 503.1, 504 R; 382/7; 356/71; 283/85, 92

[56] References Cited

U.S. PATENT DOCUMENTS 4,533,244 8/1985 Kaule et al. .......................... 356/71
4,645,936 2/1987 Gorgone3 .......................... 356/71
4,889,365 12/1989 Chovinard .......................... 283/70

FOREIGN PATENT DOCUMENTS 0543058 5/1993 European Pat. Off. .
597434 5/1934 Germany .
2428975 6/1978 Germany .
3233005 7/1984 Germany .
3506804 9/1986 Germany .
9306783.6 8/1993 Germany .
9307829.3 9/1993 Germany .
9308547.8 9/1993 Germany .
4219303 12/1993 Germany .

*Primary Examiner*—Jack I. Berman
*Assistant Examiner*—James Beyer
*Attorney, Agent, or Firm*—Oliff & Berridge

[57] ABSTRACT

An object of the invention is to provide a pocket sized instrument for reliable recognition of authenticity features of banknotes and other security documents. A basic embodiment of the instrument includes an elongated rod with a handle part at one end. The handle part contains the battery housing and the switch and is provided with a clip for facilitating handling. The other end of the rod includes a frontal test part. A banknote can be passed through a slit in the frontal test part and exposed to the enclosed optical elements. Authenticity features of the document become visible through illumination.

18 Claims, 7 Drawing Sheets

INSTRUMENT FOR THE VISUAL RECOGNITION OF AUTHENTICITY FEATURES IN BANKNOTES AND SECURITY DOCUMENTS

BACKGROUND OF THE INVENTION

The invention concerns an instrument of pocket size for use by anybody for reliable recognition of features of authenticity of banknotes and other security documents.

The increasing prevalence of money forging, especially because of the highly accurate color fidelity of color copiers, creates a demand for the improved recognition of forgeries in the daily handling of banknotes. The various well-known large banknote test instruments, which are designed as table instruments dependent on the electricity network, have little mobility and operate by the optical or electrical measurement of certain parameters of banknotes. It is, therefore, desirable to create a handy pocket instrument, which is suitable for use by everybody and is also suitable for carrying around every day.

A hand instrument for the recognition of forged banknotes is, however already known (EP-A-0 543 058). This instrument has the shape of a pocket torch, which should radiate light within the wave length limits of 100 to 500 nm, so as to illuminate the banknotes and to stimulate fluorescent dyes present in the banknotes to reflect. However, in shops with bright neon lighting or in daylight, testing of banknotes with this known instrument can hardly be possible. A pure fluorescence test does not seem satisfactory either.

SUMMARY OF THE INVENTION

The invention is, therefore, based on the task of creating a pocket instrument for the testing of banknotes and other security documents for features of authenticity. The invention makes possible a reliable visual judgment of the authenticity of banknotes under the conditions pertaining during daily business.

According to the invention this task is solved by means of the instrument which is presented in its essential basic concept in patent claim 1 and which is further developed in the subsidiary claims.

BRIEF DESCRIPTION OF THE DRAWINGS

The invention is explained in greater detail below by means of examples with reference to the attached drawings.

DETAILED DESCRIPTION OF PREFERRED EMBODIMENTS

The basic concept the invention is common to all examples of, i.e. the design of the instrument throughout as an elongated rod with a handle part at the end which contains the battery housing, switch and a frontal test part. The frontal test part contains a test slit through which a banknote can be passed to be exposed to the optics and the lighting. The rear handle part is suitably provided with a holding clip so as to be able to carry the instrument in an inner jacket pocket or a breast pocket or similar pocket, secure against dropping out as in the case of a ball point pen.

Figure 1:
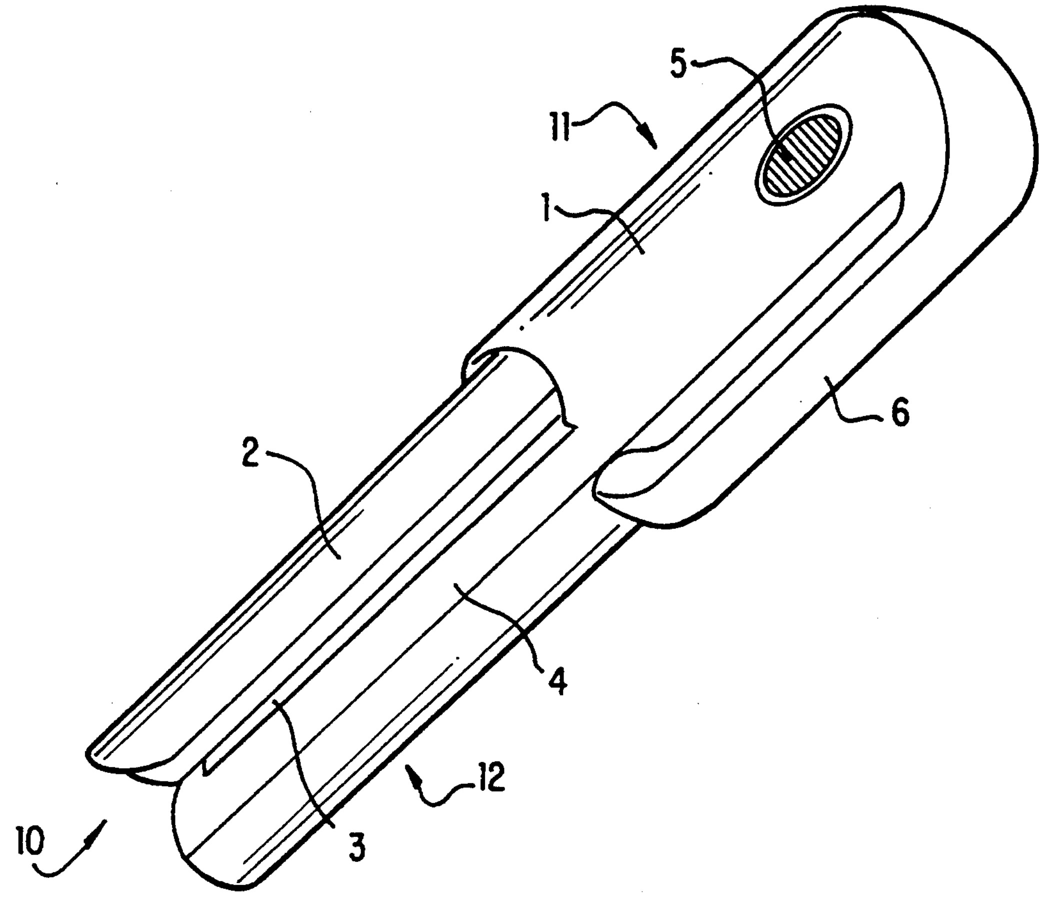
FIG. 1 shows an instrument according to the invention in diagrammatic representation in perspective.
Figure 2:
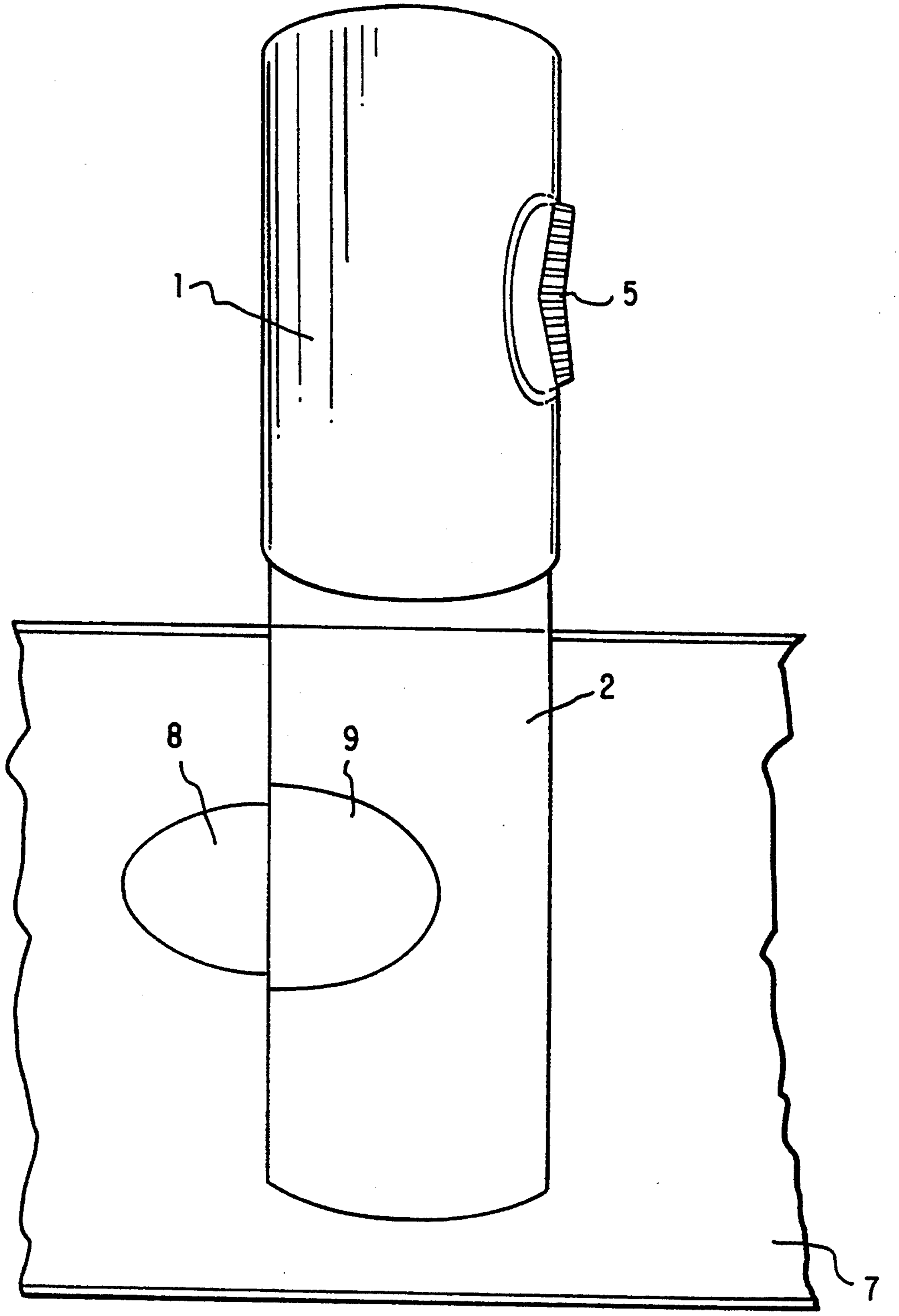
FIG. 2 illustrates the instrument according to FIG. 1 in top view during use.
Figure 3:
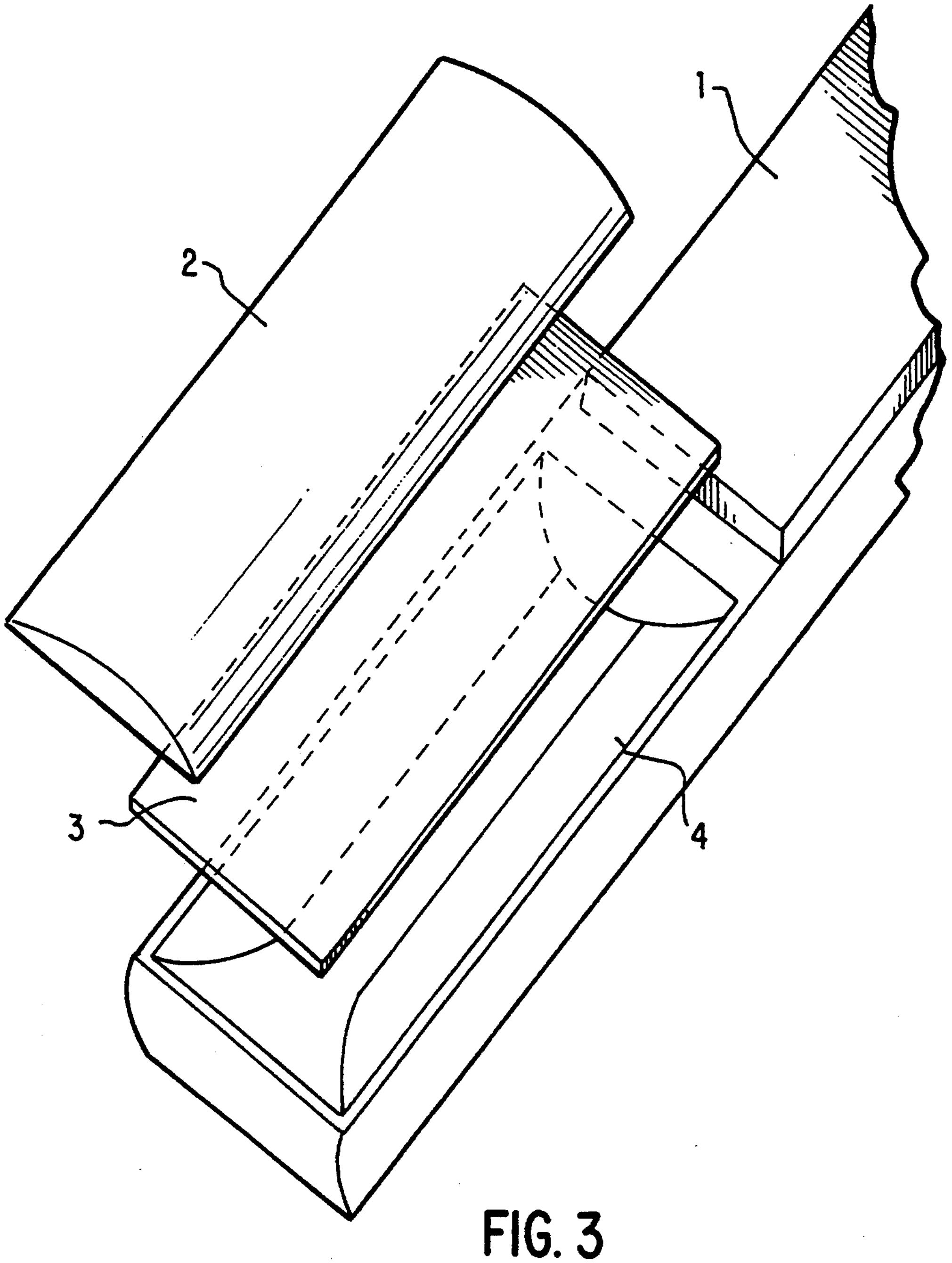
FIG. 3 illustrates the front part of an instrument according to FIG. 1 with modified housing shape in an exploded perspective view.

The embodiment of the instrument according to the invention represented in FIGS. 1 to 3 has, as can be seen, a definite rod shape and need not be much thicker than a fat fountain pen. The housing 1, in its rear part is designed as handle part 11 and serves as a compartment for the battery (not shown). The rear part also contains a switch 5 for switching the instrument on and off and a holding clip 6.

The frontal test part 12 of the instrument is a continuation of the handle part 11. The test part is also rod shaped and in its lower part consists of a rod shaped frontal extension of the handle part 11. The test part also consists of a frontal extension of the housing 1 which is designed to be integral with the handle part. This extension includes lamp chamber 4, designed to house the light globes (not shown). The upper part of this lamp chamber 4 is closed off by means of a translucent type glass diffusion screen which serves as a lighted surface for locating the banknote or similar document which is to be tested. Above the diffusion screen 3 there is a finger shaped rod lens 2 which extends from the upper part of the handle part 11 toward the front. This lens is designed to be plano-convex, i.e. with a cylindrically vaulted upper side and a plane underside. Between the plane underside of the rod lens 2 and the upper side of the diffusion screen 3 there is test slit which is closed off only at the back by the handle part 12 but which is open on all three other sides and serves for the sliding through of a banknote. The lamp chamber 4 serves for holding a light globe as well as possibly a UV-lamp which can be switched on alternatively by means of the switch 5. A part of the banknote which at any time is in the slit between rod lens 2 and diffusion screen 3 is, therefore, area lighted by way of the diffusion screen 3, from the lamp chamber 4 with normal light or with UV-light. The note is visible from above, enlarged by the rod lens 2 which serves as enlargement optics, so that security features of all kind are easily recognized.

The rod lens 2 can also be designed wholly or partially as a bifocal lens, so as to be able to inspect a partial area of the banknote with a stronger magnification than that of the other area.

A particularly essential feature of the instrument according to the invention, and, therefore, a considerable advantage of the instrument is the, already described, rod shape in its total design. The rod shape encompasses the handle part as well as the front test part, whereby with compact a design as possible, as efficient banknote testing can be carried out in one passage of the banknote. The length of the frontal test part can be selected so that it corresponds to the whole width of at least a smaller banknote, and, therefore, covers at least the greater part of the width also of a larger banknote without the instrument losing either its handiness in use or its ease of transport. Thus, a single passage of the banknote through the slit between rod lens and diffusion screen is sufficient to clearly discern, over the whole width of the banknote, all its security features such as water marks, printing details only visible on magnification, security threads with multiple engravings of the money value, composite complementary pictures formed by print elements on both sides of the banknote, fluorescent and non-fluorescent areas or components etc. The design of the instrument is not like a pocket torch, which only throws a light ray onto the banknote to be tested. Instead this form of closed lighting chamber with diffusion screen and the enlargement optics above it, with the banknote to be inserted between them, prevents disturbance effects through artificial or natural lighting of the surroundings, so that a banknote can be tested with this hand held instrument as effectively as with larger table model instruments. The top view according to FIG. 2 shows the instrument in diagrammatic form in actual use with the passage of a banknote 7 through the slit below the rod lens 2, whereby a safety feature 8 is visible.

Figure 4:
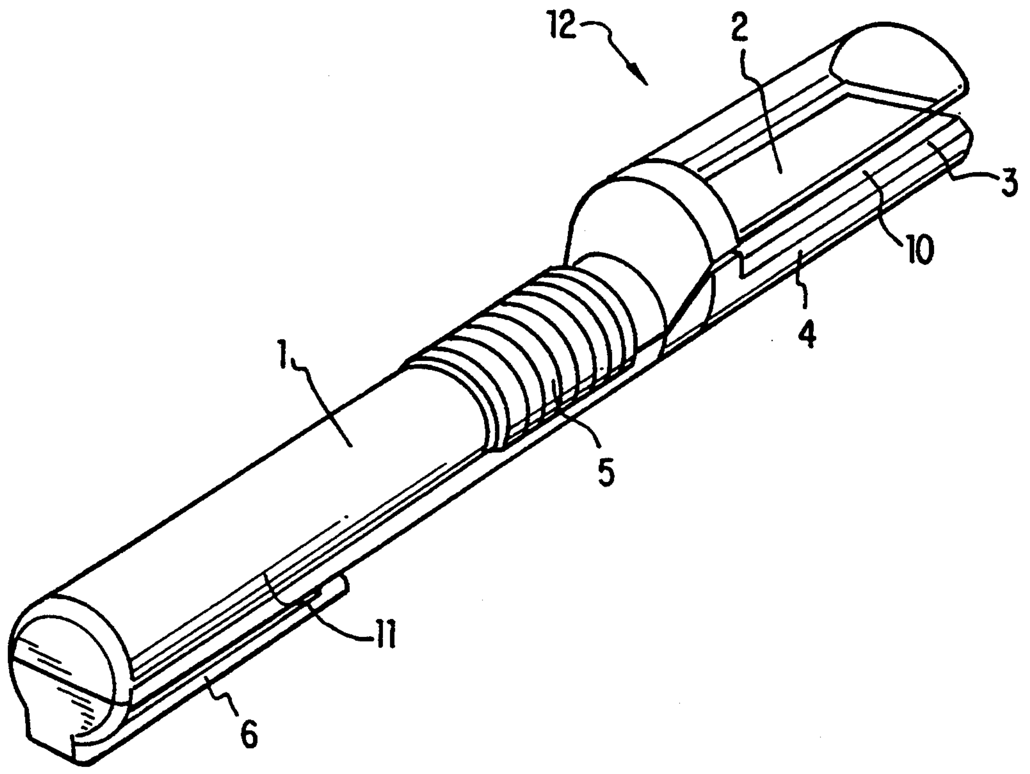
FIG. 4 illustrates a further embodiment of the instrument according to the invention in perspective view.

The embodiment according to FIGS. 4 and 5 again has the basic rod shape of the whole instrument, whereby the rear part of the housing 1 is again designed as handle part 11 with battery compartment (not shown in detail), a holding clip 6 and a switch 5. The switch 5 is here designed as a slide switch with a somewhat different design than that of the previously described embodiment. In the embodiment according to FIGS. 4 and 5, the front part 12 of the instrument, while again representing a rod shaped extension of the handle part, has been made thicker compared to the handle part. Now, a larger area of the banknote can be viewed, because of the enlargement of the diffusion screen 3 with its lighted surface and the rod lens 2, without the instrument becoming less handy or less compact.

Figure 5:
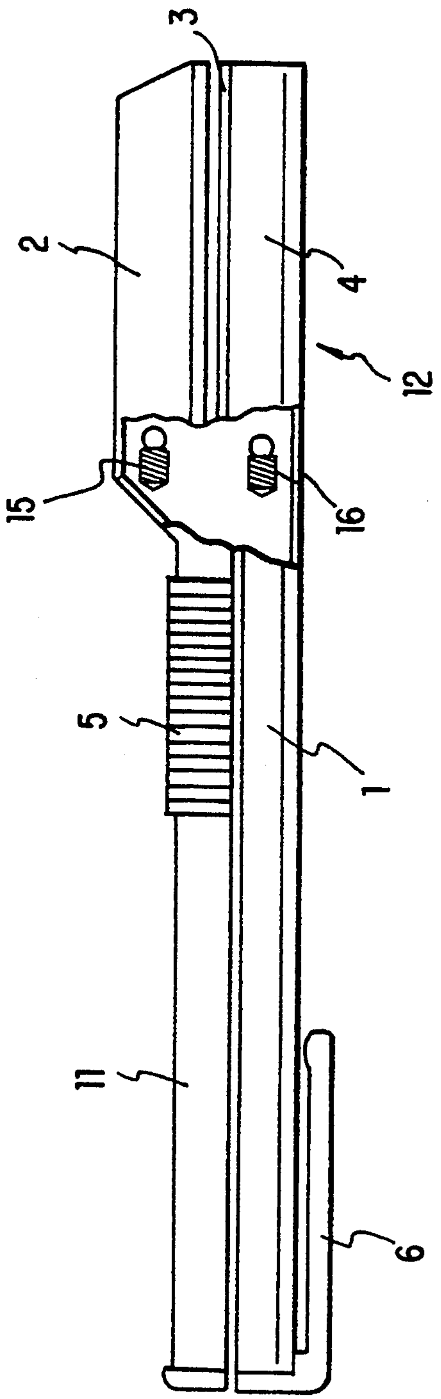
FIG. 5 illustrates the instrument according to FIG. 4 in cut out side view.

As can be seen in the side view according to FIG. 5, in this embodiment the rod lens 2 is designed as an illuminated magnifying glass by means of a light globe 15 which is built into the handle part, and which is only shown diagrammatically. A lower lamp 16 is shown diagrammatically in the lighting chamber 4. The lamp 15 can be a UV-lamp, so as to iluminate the tested banknote by way of rod lens 2 with UV-light from above, while the lower lamp 16 can be a normal light source for shining through the banknote from below.

In the embodiment according to the FIGS. 6 to 10 elongated rod shape is again characteristic for the instrument, but is somewhat widened when compared with the examples described so far, however also somewhat flattened. Through this embodiment the invention acquires two additional advantages. First, carrying the instrument in the coat pocket or the breast pocket is still more agreeable as the flattened housing shape makes the coat look less thick. The somewhat enlarged width is immaterial. Second, the somewhat widened shape opens up an improved lighting possibility. Lighting can be provided from the side, by means of tube shaped lamps, into the diffusion screen and the rod shaped lens over their whole lengths and. Therefore a still more effective and more even illumination over the whole length of the testing part of the instrument is achieved.

Figure 6:
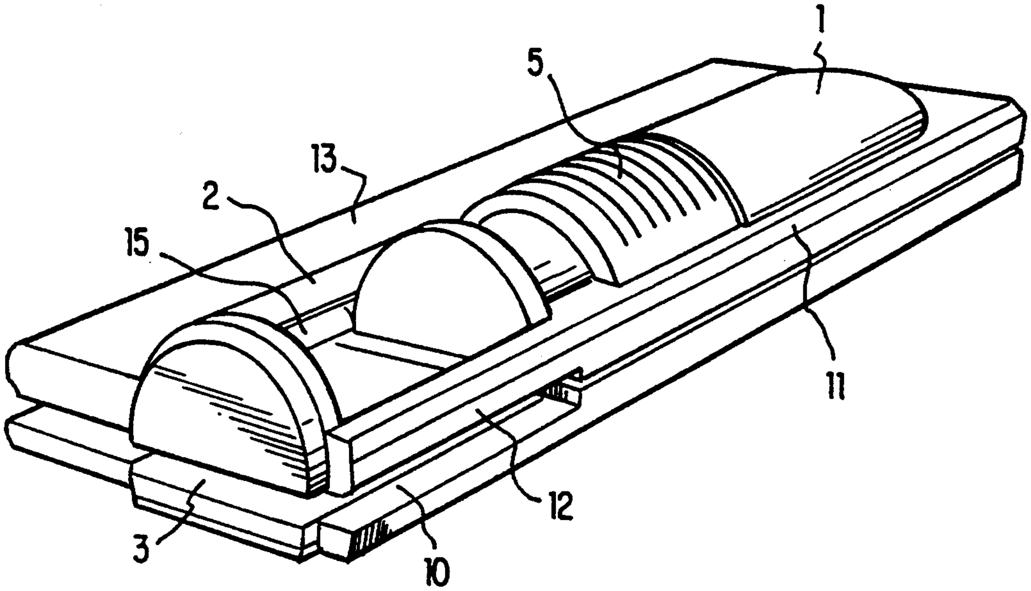
FIG. 6 illustrates a further embodiment of the instrument according to the invention in perspective view.
Figure 9:
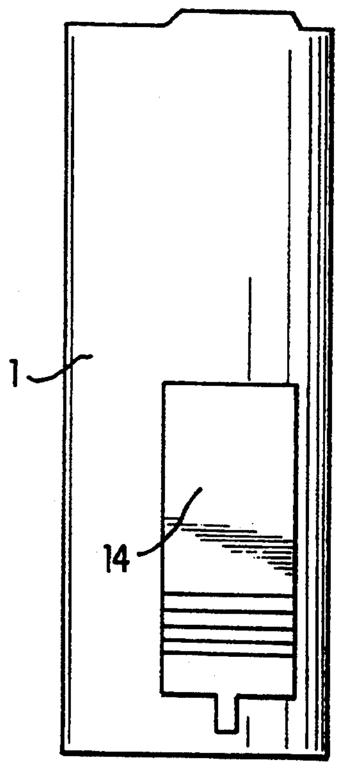
FIG. 9 illustrates the instrument according to FIG. 6 in bottom view.
Figure 8:
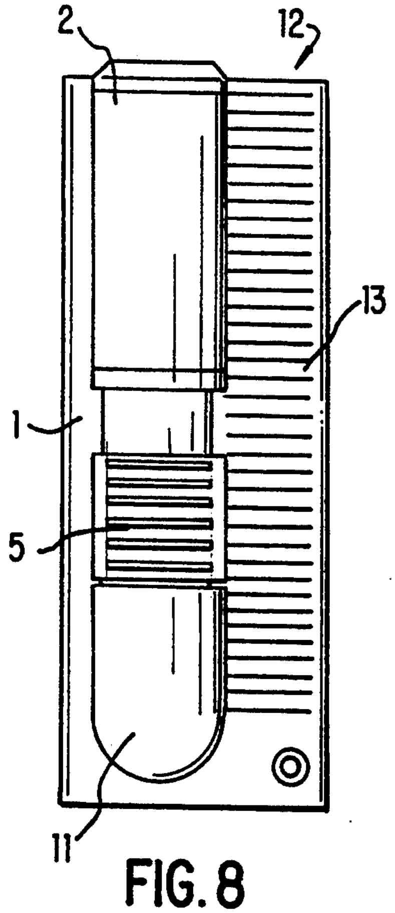
FIG. 8 the instrument according to FIG. 6 in top view.
Figure 7:
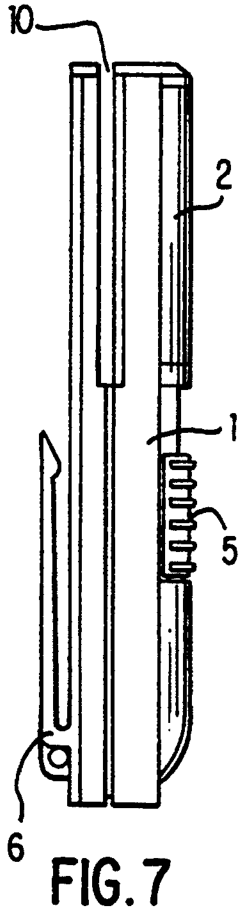
FIG. 7 illustrates the instrument according to FIG. 6 in side view.
Figure 10:
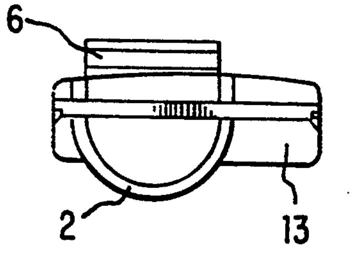
FIG. 10 illustrates the insrument according to FIG. 6 in frontal view.

As can be seen in FIG. 6, the basic round rod shape of the instrument as was used in the two previously described execution examples is still clearly recognizable. However, the instruments underside is obviously flattened and widened on one side by means of a flat side attachment 13. On the upper side of the instrument the round rod shape is maintained in the front functional part 12 by the rod shaped lens 2 and continues at the back in the handle part 11 with a corresponding vaulting of the housing for forming the battery compartment. In the battery compartment area of the housing a slide switch 5 is again provided. In the bottom view of FIG. 9 a battery compartment cover 14 is visible on the handle part.

In the frontal part of the lateral side attachment 13 beside the rod shaped lens 2, a tube shaped UV-lamp 15 is housed, so as to illuminate the tested banknote area through the rod shaped lens with UV-light, so that fluorescent areas or fluorescent paper fibres become visible. In the lower part of this lateral attachment 13 a tube shaped lamp (not shown) can be provided for, in order to feed light laterally into the diffusion screen 3 below the rod shaped lens 2 for the illumination of the tested banknote area from below.

The instrument can, of course, also be provided with a connection (not shown) for an external current source. The connection can be in the form of a socket in the handle part 11 or a connecting cable, either fixed or detachable, with a plug for a motor car cigarette lighter, a power pack or similar device. Such a connection can be provided in addition to or instead of a battery. The battery compartment does not have to be located in the handle part, although it is favorably housed there because of the available space. The initiating electrode for the UV-lamp can also be located in the handle part.

I claim:

1. An instrument for the visual detection of authenticity features in banknotes and security documents, the instrument comprising:

frontal and rear sections forming an elongated rod-shape;

said frontal section having:

a finger-shaped lower part;

a diffusion screen connected to said lower part, said diffusion screen extending to said rear section;

an illumination device for illuminating said diffusion screen and a test object; and a finger-shaped forward projecting upper part including an optical element, said optical element extending to said rear section, said upper and lower parts of said frontal section having a slit therebetween for holding a test object.

2. The instrument according to claim 1, wherein said rear section comprises a handle part having a battery compartment shaped to house a battery powering said illumination device.

3. The instrument according to claim 1, wherein said rear section of the instrument comprises a switch for activating the illumination device.

4. The instrument according to claim 1, wherein said instrument rear section includes an integral holding clip.

5. The instrument according to claim 1, wherein said optical element comprises a rod shaped lens in the form of a cylinder segment.

6. The instrument according to claim 1, wherein the lower part of said frontal section includes a lamp chamber shaped to hold at least one lamp, said lamp chamber being closed by said diffusion screen.

7. The instrument according to claim 1, wherein said frontal section has a larger diameter than said rear section.

8. The instrument according to claim 1, wherein said optical element is illuminated from a portion of said lower part facing the upper part by a lamp.

9. The instrument according to claim 1, wherein said diffusion screen can be illuminated from a frontal end of the diffusion screen adjacent the rear section by a lamp means located adjacent said rear section.

10. The instrument according to claim 1, wherein said instrument has a vaulted shape on a top of the instrument and a flat shape on a bottom of the instrument.

11. The instrument according to claim 1, wherein said illumination device comprises a lamp positioned along at least one longitudinal side of said optical element for lateral feeding of light into said optical element in the upper part of said frontal section.

12. The instrument according to claim 11, wherein said lamp is tubular.

13. The instrument according to claim 11, wherein said instrument includes a flattened widening on one side, said flattened widening containing a housing part for holding the lamp for the lateral feeding of light into said optical element and said diffusion screen.

14. The instrument according to claim 1, wherein said illumination device comprises a lamp positioned along at least one longitudinal side of said diffusion screen for the lateral feeding of light into said diffusion screen in the lower part of said frontal section.

15. The instrument according to claim 1, wherein said illumination device includes at least one lamp for normal light and one lamp for ultraviolet light.

16. The instrument according to claim 15, wherein said lamp for normal light is provided to illuminate the diffusion screen, and said lamp for ultraviolet light is provided for feeding light into the optical element.

17. The instrument according to claim 1, wherein said rear part includes a connection for connecting the instrument to an external source of current.

18. The instrument according to claim 17, wherein said connection includes a cable having a plug for plugging into an automobile cigarette lighter.

* * * * *